(12) United States Patent
Kim

(10) Patent No.: US 12,238,538 B2
(45) Date of Patent: Feb. 25, 2025

(54) BASE STATION DEVICE AND METHOD FOR OPERATING BASE STATION DEVICE

(71) Applicant: TRENTO SYSTEMS.INC., Daejeon (KR)

(72) Inventor: Young Jae Kim, Daejeon (KR)

(73) Assignee: TRENTO SYSTEMS.INC., Daejeon (KR)

( * ) Notice: Subject to any disclaimer, the term of this patent is extended or adjusted under 35 U.S.C. 154(b) by 363 days.

(21) Appl. No.: 17/877,427

(22) Filed: Jul. 29, 2022

(65) Prior Publication Data

US 2022/0369129 A1    Nov. 17, 2022

Related U.S. Application Data

(63) Continuation of application No. PCT/KR2020/017577, filed on Dec. 3, 2020.

(30) Foreign Application Priority Data

Jan. 30, 2020  (KR) .......................... 10-2020-0011032

(51) Int. Cl.
| | |
|---|---|
| *H04W 16/28* | (2009.01) |
| *H04B 7/0456* | (2017.01) |
| *H04W 36/00* | (2009.01) |
| *H04W 36/24* | (2009.01) |
| *H04W 36/32* | (2009.01) |

(52) U.S. Cl.
CPC ............ *H04W 16/28* (2013.01); *H04B 7/046* (2013.01); *H04W 36/0058* (2018.08); *H04W 36/249* (2023.05); *H04W 36/324* (2023.05); *H04W 36/328* (2023.05)

(58) Field of Classification Search
CPC ............. H04W 16/28; H04W 36/0058; H04W 36/249; H04W 36/324; H04W 36/328; H04W 64/006; H04B 7/046; H04B 7/0617; H04B 7/0408; H04B 7/0413; H04B 7/0456
See application file for complete search history.

(56) References Cited

U.S. PATENT DOCUMENTS

| | | | | |
|---|---|---|---|---|
| 9,318,794 | B2 * | 4/2016 | Chang | H04W 72/51 |
| 10,129,763 | B1 * | 11/2018 | Bui | H04W 16/28 |
| 10,362,589 | B2 * | 7/2019 | Kim | H04B 7/0695 |
| 11,671,838 | B2 * | 6/2023 | Cimpu | H04W 24/02 |
| | | | | 455/446 |
| 2009/0023477 | A1 * | 1/2009 | Staudte | H04W 16/28 |
| | | | | 455/562.1 |
| 2011/0075689 | A1 * | 3/2011 | Miyata | H01S 5/0654 |
| | | | | 372/20 |

(Continued)

FOREIGN PATENT DOCUMENTS

| | | | | |
|---|---|---|---|---|
| EP | 3472942 | B1 * | 8/2021 | ............ H01Q 1/246 |
| JP | 5983734 | B2 | 9/2016 | |

(Continued)

*Primary Examiner* — Jay P Patel
(74) *Attorney, Agent, or Firm* — WTA Patents

(57) ABSTRACT

The present disclosure relates to a base station apparatus and a method of operating a base station apparatus capable of improving accuracy of beam steering (steerability) in performing beamforming using an antenna based on multiple input multiple output (MIMO).

11 Claims, 14 Drawing Sheets

(56) References Cited

U.S. PATENT DOCUMENTS

| | | | | |
|---|---|---|---|---|
| 2012/0235055 A1* | 9/2012 | Madokoro | ................ | G21K 1/00 |
| | | | | 250/398 |
| 2013/0040682 A1* | 2/2013 | Chang | .................. | H04L 67/306 |
| | | | | 342/368 |
| 2014/0333500 A1* | 11/2014 | Moon | .................... | H01Q 21/08 |
| | | | | 343/758 |
| 2015/0049650 A1* | 2/2015 | Choi | .................... | H04W 52/0206 |
| | | | | 370/278 |
| 2015/0141026 A1* | 5/2015 | Jover | ................... | H04W 16/28 |
| | | | | 455/452.1 |
| 2015/0372737 A1* | 12/2015 | Park | ..................... | H04B 7/0626 |
| | | | | 370/329 |
| 2016/0021551 A1* | 1/2016 | Park | ..................... | H04B 7/0619 |
| | | | | 370/328 |
| 2016/0255590 A1* | 9/2016 | Wang | .................. | H04B 7/0617 |
| | | | | 370/329 |
| 2016/0352010 A1* | 12/2016 | Haskell | .................... | H01Q 3/30 |
| 2017/0026846 A1* | 1/2017 | Byun | .................... | H04W 24/02 |
| 2017/0208479 A1* | 7/2017 | Takeda | ................. | H04B 7/0617 |
| 2018/0013476 A1* | 1/2018 | Ramachandra | ....... | H04B 7/0621 |
| 2018/0227928 A1* | 8/2018 | Kim | ....................... | H04L 5/0023 |
| 2018/0316402 A1* | 11/2018 | Jaldén | ...................... | H04B 7/0626 |
| 2018/0351605 A1* | 12/2018 | Liang | ................... | H04B 7/0617 |
| 2019/0254082 A1* | 8/2019 | Takeda | ................ | H04W 52/242 |
| 2019/0349872 A1* | 11/2019 | Harada | .................... | H04L 27/26 |
| 2019/0350001 A1* | 11/2019 | Takeda | ................. | H04B 7/0617 |
| 2020/0169895 A1* | 5/2020 | Chen | ....................... | G06N 3/045 |
| 2021/0270241 A1* | 9/2021 | Svinth | ..................... | F03D 13/10 |
| 2022/0278737 A1* | 9/2022 | Vejlgaard | ............ | H04B 7/0482 |
| 2022/0338017 A1* | 10/2022 | Cimpu | .................. | H04W 16/10 |

FOREIGN PATENT DOCUMENTS

| | | |
|---|---|---|
| JP | 2017118462 A | 6/2017 |
| KR | 100867315 B1 | 11/2008 |
| KR | 10-2008-0114486 A | 12/2008 |
| KR | 10-2011-0008704 A | 1/2011 |
| KR | 10-2018-0099130 A | 9/2018 |
| KR | 101951679 B1 | 2/2019 |

* cited by examiner

BASE STATION DEVICE AND METHOD FOR OPERATING BASE STATION DEVICE

CROSS-REFERENCE TO RELATED APPLICATIONS

This application is a bypass continuation application of International PCT Application No. PCT/KR2020/017577, filed on Dec. 3, 2020, which claims priority to Republic of Korea Patent Application No. 10-2020-0011032, filed on Jan. 30, 2020, which are incorporated by reference herein in their entirety.

TECHNICAL FIELD

The present disclosure relates to a method of improving accuracy of beam steering (steerability) in performing beamforming using an antenna based on multiple input multiple output (MIMO).

BACKGROUND ART

Recently, by performing beamforming technology-based communication on the premise that a transmitting device includes a plurality of antennas and a receiving device includes a plurality of antennas, various technologies have emerged that may expect a transmission capacity gain proportional to the number of transmit antennas and the number of receive antennas without additional use of frequency or power. A representative example is a MIMO technology.

In this regard, it is premised that a transceiver in a MIMO technology communication system (hereinafter, referred to as a MIMO system) has a hardware antenna structure to perform the beamforming. That is, in the existing 3G and 4G mobile communication, static coverage is configured through a base station MIMO configuration of 2-layer and 4-layer or less, and in a base station of the current 5G environment or the future 6G environment, it is possible to form a larger number of antenna beam patterns through a massive MIMO configuration of 8-layer, 16-layer, or more.

In this regard, in the 5G base station adopting the massive MIMO configuration, it is possible to dynamically form a beam pattern according to the wireless environment conditions, thereby obtaining the same effect of improving data capacity and propagation environment within cell coverage as in the related art.

However, in this way, compared to the 3G and 4G base station MIMO configuration, the current 5G base station massive MIMO configuration may form a plurality of beam patterns, whereas it can be seen that it is inevitable that widths of each beam pattern are narrow in proportion to the increasing number of beam patterns.

Therefore, in the 5G environment, in order to accurately direct (form) a beam pattern to a terminal, it is necessary to improve the accuracy of the beam steering (steerability) by the width of the narrowed antenna beam pattern.

SUMMARY

The present disclosure is to improve accuracy of beam steering (steerability) in performing beamforming using an antenna based on multiple input multiple output (MIMO).

According to an aspect of the present disclosure, a base station apparatus includes: a receiver configured to receive beam control information generated based on a result of movement detection from a terminal according to movement detection in the terminal in which a communication link is established with the base station apparatus through a beam pattern; and a controller configured to control a beam pattern to be tracked and formed at a change position predicted from the terminal by adjusting a directing direction of the beam radiated to the terminal based on the beam control information.

The beam control information may include movement displacement information of the terminal which is a tilt variable value required for adjusting the directing direction of the beam radiated to the terminal, and the base station apparatus may further include generating a beamforming codebook in which a tilt variable value for forming a beam pattern is matched for each of at least one change prediction position that is a change position predicted for the terminal based on the movement displacement information.

When a signal having equal to or greater than predefined minimum signal strength transmitted from the terminal is not received through a beam pattern tracked and formed to the change position of the terminal, the controller may form a unicast beam pattern for each of the at least one change prediction positions based on the beamforming codebook.

When the signal equal to or greater than the predefined minimum signal strength transmitted from the terminal is received through a beam pattern of a specific change prediction position among the at least one change prediction position, the controller may re-establish the communication link with the terminal through the beam pattern of the specific change prediction position.

When a handoff situation occurs in which the signal of the predefined minimum signal strength or higher transmitted from the terminal is not received through all of the beam patterns of each of the at least one change prediction positions, the controller may establish the communication link with the terminal according to the beamforming codebook generated based on the movement displacement information of the terminal in a neighboring base station apparatus by transmitting the movement displacement information of the terminal to the neighboring base station apparatus attempting handoff of the terminal.

The generator may generate the beamforming codebook through an autocorrelation function-based linear prediction algorithm that linearly predicts a change in position according to the movement of the terminal in a time domain.

When the movement distance of the terminal is a non-linear movement that is greater than or equal to a threshold distance, the generator may generate the beamforming codebook through offset correction for setting an interval of the beam pattern to be narrow at a set interval for linearization of a change in position greater than or equal to a threshold speed based on a moving speed of the terminal, and generate the beamforming codebook through the offset correction for setting the interval of the beam pattern to be wide at a set interval for linearization of a change in position less than a threshold speed.

The beamforming codebook may be generated every time the movement displacement information of the terminal is updated with respect to the base station apparatus in a core network that receives and updates the movement displacement information of the terminal from the base station apparatus, and transmitted to the base station apparatus.

The movement displacement information may include at least one of a speed ($\Delta v$) obtained by integrating acceleration with respect to time, displacement information ($\Delta s$) obtained by integrating the speed ($\Delta v$) with respect to time, a displacement angle ($\Delta \theta$) obtained by integrating angular velocity (ω) with respect to time, a movement direction (ΔD) identified by an accumulation of the displacement angle (Δθ), and an altitude (Δh).

According to another aspect of the present disclosure, a method of operating a base station apparatus includes: receiving beam control information generated based on a result of movement detection from a terminal according to movement detection in the terminal in which a communication link is established with the base station apparatus through a beam pattern; and controlling a beam pattern to be tracked and formed at a change position predicted from the terminal by adjusting a directing direction of the beam radiated to the terminal based on the beam control information.

The beam control information may include movement displacement information of the terminal which is a tilt variable value required for adjusting the directing direction of the beam radiated to the terminal, and the method may further include generating a beamforming codebook in which a tilt variable value for forming a beam pattern is matched for each of at least one change prediction position that is a change position predicted for the terminal based on the movement displacement information.

When a signal having equal to or greater than predefined minimum signal strength transmitted from the terminal is not received through a beam pattern tracked and formed to the change position of the terminal, in the controlling, a unicast beam pattern for each of the at least one change prediction positions may be formed based on the beamforming codebook.

When the signal equal to or greater than the predefined minimum signal strength transmitted from the terminal is received through a beam pattern of a specific change prediction position among the at least one change prediction position, in the controlling, the communication link may be re-established with the terminal through the beam pattern of the specific change prediction position.

When a handoff situation occurs in which the signal of the predefined minimum signal strength or higher transmitted from the terminal is not received through all of the beam patterns of each of the at least one change prediction positions, in the controlling, the communication link may be established with the terminal according to the beamforming codebook generated based on the movement displacement information of the terminal in a neighboring base station apparatus by transmitting the movement displacement information of the terminal to the neighboring base station apparatus attempting handoff of the terminal.

In the generating, the beamforming codebook may be generated through an autocorrelation function-based linear prediction algorithm that linearly predicts a change in position according to the movement of the terminal in a time domain.

When the movement distance of the terminal is a nonlinear movement that is greater than or equal to a threshold distance, in the generating, the beamforming codebook may be generated through offset correction for setting an interval of the beam pattern to be narrow at a set interval for linearization of a change in position greater than or equal to a threshold speed based on a moving speed of the terminal, and the beamforming codebook may be generated through the offset correction for setting the interval of the beam pattern to be wide at a set interval for linearization of a change in position less than a threshold speed.

The beamforming codebook may be generated every time the movement displacement information of the terminal is updated with respect to the base station apparatus in a core network that receives and updates the movement displacement information of the terminal from the base station apparatus, and transmitted to the base station apparatus.

The movement displacement information may include at least one of a speed (Δv) obtained by integrating acceleration with respect to time, displacement information (Δs) obtained by integrating the speed (Δv) with respect to time, a displacement angle (Δθ) obtained by integrating angular velocity (ω) with respect to time, a movement direction (ΔD) identified by an accumulation of the displacement angle (Δθ), and an altitude (Δh).

Accordingly, according to a base station apparatus and a method of operating a base station apparatus of the present disclosure, it becomes possible to find a terminal newly entering coverage or to track a terminal that is moving within the coverage by a unicast method that is a method of directly inputting, as a tilt variable value required for adjusting a directing direction of a beam, beam control information (movement displacement information) generated (calculated) by allowing a terminal to directly detect movement, thereby improving accuracy of beam steering (steerability) and minimizing power consumption compared to the existing 5G environment in which a beam pattern is formed through a broadcast method.

BRIEF DESCRIPTION OF DRAWINGS

The foregoing and other objects, features, and advantages of the invention, as well as the following detailed description of the embodiments, will be better understood when read in conjunction with the accompanying drawings. For the purpose of illustrating the invention, there is shown in the drawings an exemplary. The use of the same reference numerals or symbols in different drawings indicates similar or identical items.

DETAILED DESCRIPTION

Hereinafter, exemplary embodiments of the present disclosure will be described with reference to the accompanying drawings.

In an embodiment of the present disclosure, multiple input multiple output (MIMO) that may be applied to the current 5G environment for performing communication based on beamforming technology or the future 6G environment on the premise that the number of antennas of a transmitting device and the number of antennas of a receiving device are provided in plurality.

In particular, according to an embodiment of the present disclosure, in the current 5G environment, compared to a base station MIMO configuration of 2-layer, 4-layer, or less adopted by the existing 3G and 4G environments, a massive MIMO configuration of 8-layer, 16-layer or more is assumed to form a large number of antenna beam patterns as a prerequisite technology.

In general, in the 5G base station adopting the massive MIMO configuration, it is possible to dynamically form a beam pattern according to the wireless environment conditions, thereby obtaining the same effect of improving data capacity and propagation environment within cell coverage as in the related art.

On the other hand, in order to realize the above advantages in the 5G base station that adopts such a massive MIMO configuration, for example, in the urban environment where traffic may be concentrated, it is necessary to provide a large service bandwidth for timely processing by combining a large amount of data including all signals and reflected signals generated between a terminal and a base station into a single coherent broadband signal.

In this regard, as a method of providing a similar level of large bandwidth for each terminal in the 5G, there may be a beamforming method of applying a beam pattern of a very narrow width to a terminal and directly transmitting/receiving data to the terminal through the beam pattern.

However, in this case, as a beam width becomes much narrower in the 2G, 3G and 4G environments, there is a problem in that a change position of a terminal easily deviates from coverage of the beam pattern in which a communication link may be formed even if the terminal moves short, and a service may be disconnected.

Furthermore, the existing 5G base station may scan a terminal that has entered its coverage through a beam pattern formed for the entire coverage according to a broadcast method, and provide a communication link for a beamforming service with a terminal that has entered its coverage.

However, in the broadcast method, the number of RF chains of the base station increases by the number of beam patterns formed within the coverage, which may cause another problem of aggravating power consumption of both the base station and the terminal.

Figure 1:
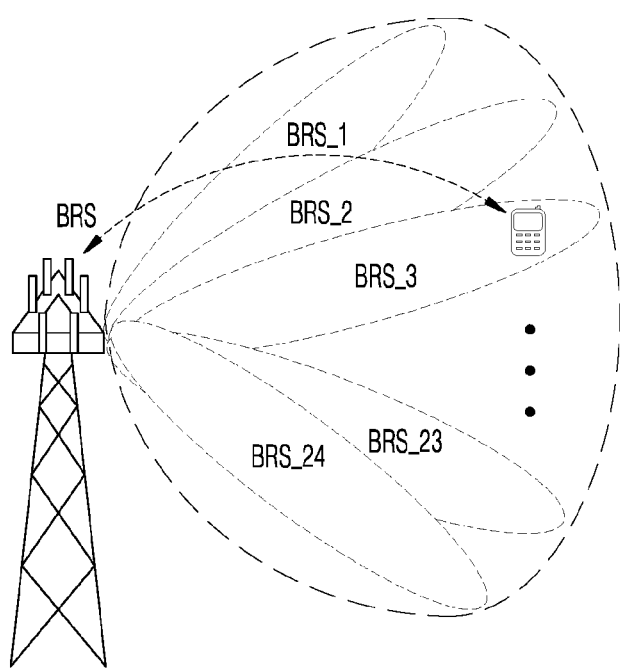
FIG. 1 is an exemplary diagram for describing a beamforming method in the existing 5G environment.

In this regard, FIG. 1 exemplarily illustrates a beamforming method in the existing 5G environment.

As illustrated in FIG. 1, the base station in the existing 5G environment, when it is necessary to find a terminal that newly enters its coverage or track a terminal that moves within the coverage, by radiating a beam according to the broadcast method, beam patterns BRS_1 to BRS_23 are formed for the entire coverage area.

In this case, the terminal may feedback, to the base station, information of, for example, BRS_3 with the best reception state among received signals through beam patterns matching their locations among the beam patterns BRS_1 to BRS_23 formed for the entire coverage, that is, through the beam patterns BRS_1 to BRS_23.

In this regard, the base station may form a communication link with the terminal through the beam pattern BRS_3 by completing a position registration and synchronization procedure for the terminal according to the feedback of the terminal through the beam pattern BRS_3.

As such, in the existing 5G environment, it may be identified that it is required to form the beam pattern for the entire coverage through the broadcast method in order to find a terminal that newly enters its coverage or track a terminal that moves within the coverage, which may cause an increase in the number of RF chains of the base station and an increase in power consumption of both the base station and the terminal.

In addition, when the number of terminals connected to the base station increases in the existing 5G environment, it may be expected that the above-described limitations may be aggravated.

Therefore, an embodiment of the present disclosure intends to propose a new method of improving accuracy of beam steering by a width of a narrowed antenna beam pattern and minimizing power consumption in order to find the terminal that newly enters the coverage of the base station or track the terminal that moves within the coverage.

Figure 2:
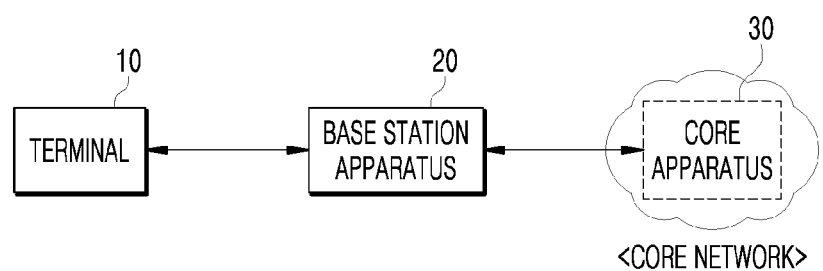
FIG. 2 is an exemplary diagram for describing a beamforming environment according to an embodiment of the present disclosure.

In this regard, FIG. 2 exemplarily illustrates a beamforming environment according to an embodiment of the present disclosure. As illustrated in FIG. 2, a beamforming environment according to an embodiment of the present disclosure may include a terminal 10 that generates and transmits beam control information, and a base station apparatus 20 that adjusts a directing direction of a beam to the terminal 10 according to the beam control information received from the terminal 10.

Figure 3:
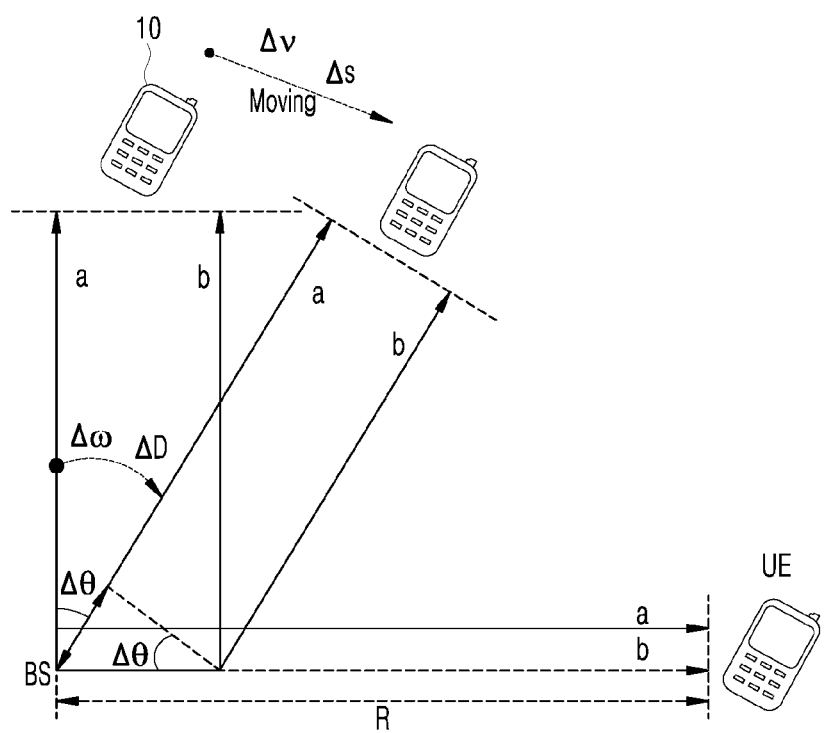
FIGS. 3 and 4 are exemplary views for describing movement displacement information according to an embodiment of the present disclosure.

Here, the beam control information includes movement displacement information directly generated (calculated) based on sensing values of an acceleration sensor and a gyro sensor, for example, as illustrated in FIG. 3 in the terminal 10 according to a movement detection in the terminal 10.

Figure 4:
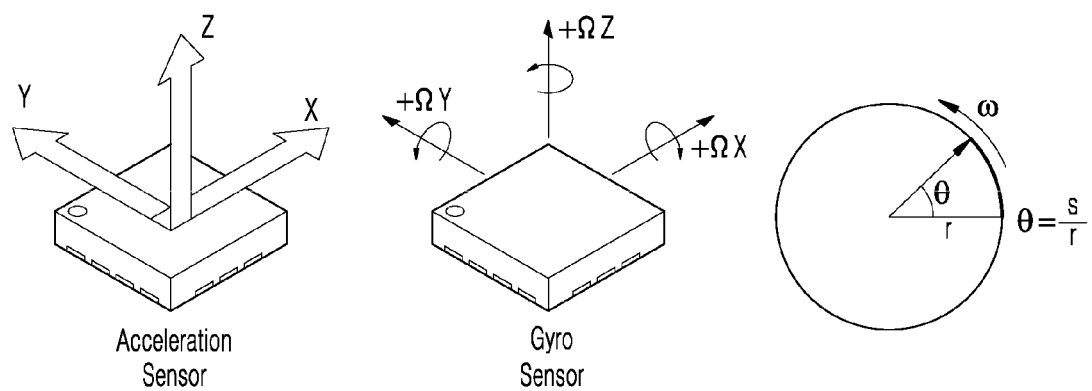

The movement displacement information may include, as a tilt variable value required for adjusting a directing direction of a beam radiated to the terminal 10, for example, as illustrated in FIG. 4, at least one of a speed ($\Delta v$) obtained by integrating acceleration identified by an acceleration sensor with respect to time, displacement information ($\Delta s$) obtained by integrating the speed ($\Delta v$) with respect to time, a displacement angle ($\Delta \theta$) obtained by integrating angular velocity ($\omega$) identified by a gyro sensor with respect to time, and a movement direction ($\Delta D$) identified by an accumulation of the displacement angle ($\Delta \theta$).

Also, it goes without saying that the movement displacement information according to the embodiment of the present disclosure may further include an altitude ($\Delta h$) identified by a barometer in addition to the above-described variable values.

For reference, the movement displacement information may be calculated by, for example, [Equation 1] and [Equation 2] below.

$$\int_{t1}^{t2} v\,dt = \int_{r(t1)}^{s(t2)} ds \quad \int_{t1}^{t2} v\,dt = s(t2) - s(t1) = \Delta s \qquad \text{[Equation 1]}$$

-continued $$v = \lim_{\Delta t \to 0} \frac{\Delta s}{\Delta t} = \frac{ds}{dt} \Leftrightarrow vdt = ds$$

$$\int_{t1}^{t2} \omega dt \quad \int_{t1}^{t2} \omega dt = \theta(t2) - \theta(t1) \quad \text{[Equation 2]}$$

$$\omega = \lim_{\Delta t \to 0} \frac{\Delta \theta}{\Delta t} = \frac{d\theta}{dt} \Leftrightarrow \omega dt = d\theta$$

The base station apparatus 20 may be understood as, for example, a 5G base station that may adjust the directing direction of the beam to the terminal 10 according to the beam control information received from the terminal 10.

Unlike the base station in the existing 5G environment, which should determine the beam control information for adjusting the directing direction of the beam by itself, it may be seen that the base station apparatus 20 has characteristics in that it may reflect the beam control information generated from the terminal 10 as it is, and adjust the directing direction of the beam to the terminal 10.

Figure 5:
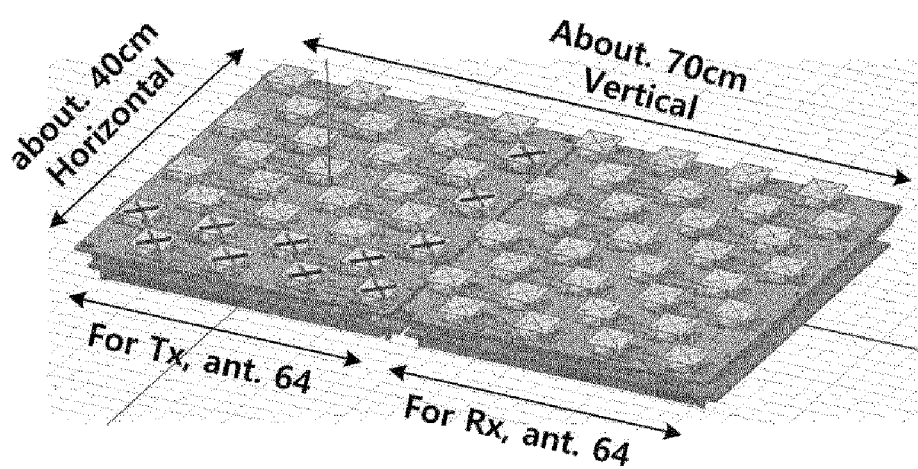
FIGS. 5 and 6 are exemplary views for describing a beamforming antenna according to an embodiment of the present disclosure.

The base station apparatus 20 may include, for example, a beamforming antenna based on massive MIMO as illustrated in FIG. 5.

Here, the beamforming antenna may be configured to have 64 each transmit/receive antennas by separating the transmit and receive antennas from 64 TDD RF switches, and may simultaneously control vertical and horizontal tilt based thereon to implement 3D beamforming.

That is, it is possible to perform 8 vertical RF beamforming (for E-Tilt use-main purpose is coverage improvement) and 4 horizontal digital beamforming (for the purpose of beamforming caller's private cell quality improvement) for each caller.

Here, 64 transmit amplifiers may be attached to a rear side of an antenna without a feed line.

Figure 6:
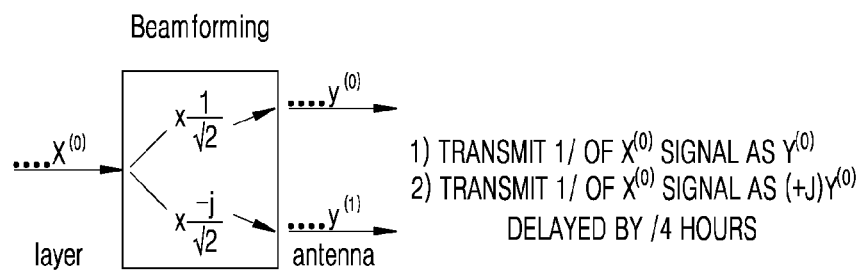

For reference, FIG. 6 exemplarily illustrates a principle of such a beamforming antenna.

In addition, the base station apparatus 20 may generate a beamforming codebook by predicting a change position of the terminal 10 moving within the coverage from the movement displacement information in the beam control information received from the terminal 10 and matching tilt variable values accordingly.

As such, the beamforming codebook may support the formation of the beam pattern according to a unicast method in the base station apparatus 20 as a result of predicting the change position of the terminal 10 moving within the coverage and matching the tilt variable values accordingly.

Meanwhile, in the beamforming environment according to the embodiment of the present disclosure, in addition to the above-described configuration, a core network device 30 located in the core network may be further included.

Such a core network device 30 may be understood as a configuration in consideration of the environment in which the above-described beamforming codebook is not directly generated by the base station apparatus 20.

In this case, the core network device 30 may receive, update, and store the movement displacement information on the terminal 10 from the base station apparatus 20, generate the beamforming codebook in which the updated and stored movement displacement information is reflected to the terminal 10 according to a request from the base station apparatus 20, and provide the generated beamforming codebook to the base station apparatus 20.

In addition, the core network device 30 may generate the beamforming codebook to which the movement displacement information of the terminal 10 received from the base station apparatus 20 is reflected in consideration of the situation in which the terminal 10 is handed off to a neighboring base station apparatus (not illustrated), and provide the generated beamforming codebook to the neighboring base station apparatus (not illustrated).

This may be understood to support the formation of the unicast beam pattern using the beamforming codebook for the neighboring base station apparatus (not illustrated).

In the beamforming environment according to the embodiment of the present disclosure, in finding a terminal that newly enters the coverage of the base station or tracking a terminal that moves within the coverage through the above-described configuration, it is possible to improve the accuracy of the beam steering and minimize the power consumption through the formation of the unicast beam pattern. Hereinafter, a more detailed description of the configuration of the base station apparatus 20 for realizing this will be continued.

Meanwhile, the following description will be based on the embodiment in which the communication link is already established through a specific beam pattern with respect to the terminal 10 located in the coverage of the base station apparatus 20, and the beamforming codebook is directly generated in the base station apparatus 20.

Here, when the terminal 10 initially enters the coverage of the base station apparatus 20 (when the beamforming codebook is not generated for the terminal), as in the existing 5G environment with reference to FIG. 1, it may be understood that the communication link with the terminal 10 may be established through the broadcast method.

Figure 7:
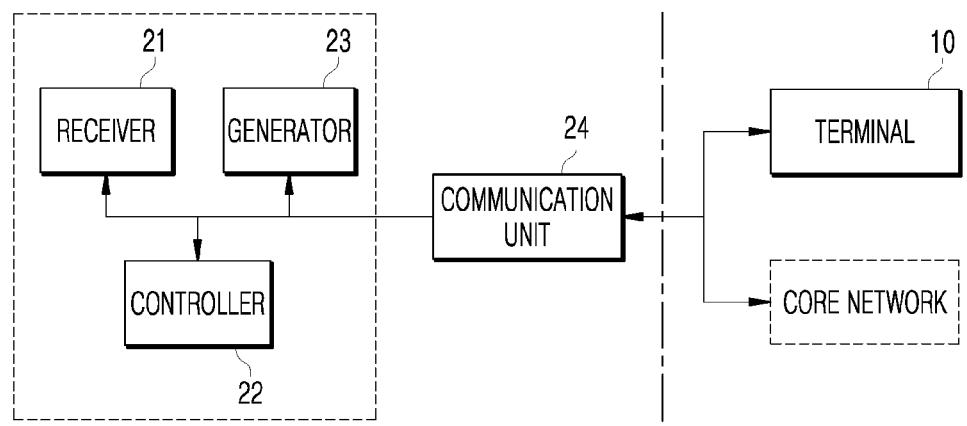
FIG. 7 is a schematic configuration diagram of a base station apparatus according to an embodiment of the present disclosure.

FIG. 7 schematically illustrates a configuration of a base station apparatus 20 according to an embodiment of the present disclosure.

As illustrated in FIG. 7, the base station apparatus 20 according to the embodiment of the present disclosure may include a configuration including a receiver 21 that receives beam control information, and a controller 22 that controls a formation of a beam pattern.

In addition, the base station apparatus 20 according to the embodiment of the present disclosure may further include a generator 23 that generates a beamforming codebook in addition to the above-described configuration.

The entire configuration or at least part of the base station apparatus 20 may be implemented in the form of a hardware module or a software module, or may be implemented in a form in which the hardware module and the software module are combined.

Here, the software module may be understood, for example, as an instruction executed by a processor for processing operations in the base station apparatus 20, and these instructions may have a form mounted in a separate memory in the base station apparatus 20.

On the other hand, in addition to the above-described configuration, the base station apparatus 20 according to the embodiment of the present disclosure may further include a communication unit 24 which is an RF module responsible for actual communication with a terminal (UE) located in a cell.

Here, the communication unit 24 may include, for example, but not limited to, an antenna system, an RF transceiver, one or more amplifiers, a tuner, one or more oscillators, a digital signal processor, a codec chipset, and a memory, and may include all known circuits performing the functions.

As described above, the base station apparatus 20 according to the embodiment of the present disclosure may form a beam pattern in a unicast method with respect to the terminal 10 located in coverage through the above-described configuration. Hereinafter, each configuration in the base station apparatus 20 for implementing this will be described in more detail.

The receiver 21 performs a function of receiving beam control information.

More specifically, the receiver 21 receives the beam control information generated based on the movement detection result from the terminal 10 according to movement detection in the terminal 10 in which the communication link is formed through the beam pattern.

Here, the beam control information received from the terminal 10 includes the movement displacement information of the terminal 10 that is the tilt variable value required for adjusting the directing direction of the beam radiated to the terminal 10.

In addition, the movement displacement information may include at least one of a speed ($\Delta v$) obtained by integrating acceleration with respect to time, displacement information ($\Delta s$) obtained by integrating the speed ($\Delta v$) with respect to time, a displacement angle ($\Delta \theta$) obtained by integrating angular velocity ($\omega$) with respect to time, a movement direction ($\Delta D$) identified by an accumulation of the displacement angle ($\Delta \theta$), and an altitude ($\Delta h$).

Meanwhile, it goes without saying that the movement displacement information according to the embodiment of the present disclosure may further include position information (latitude and longitude) measured through a GPS function supported by the terminal 10 as well as the above-described movement displacement information.

The controller 22 receives the function that controls the formation of the beam pattern.

More specifically, the controller 22 adjusts the directing direction of the beam being emitted to the terminal 10 according to the reception of the beam control information from the terminal 10 to control to be tracked and formed the beam pattern to the change position according to the movement of the terminal.

Figure 8:
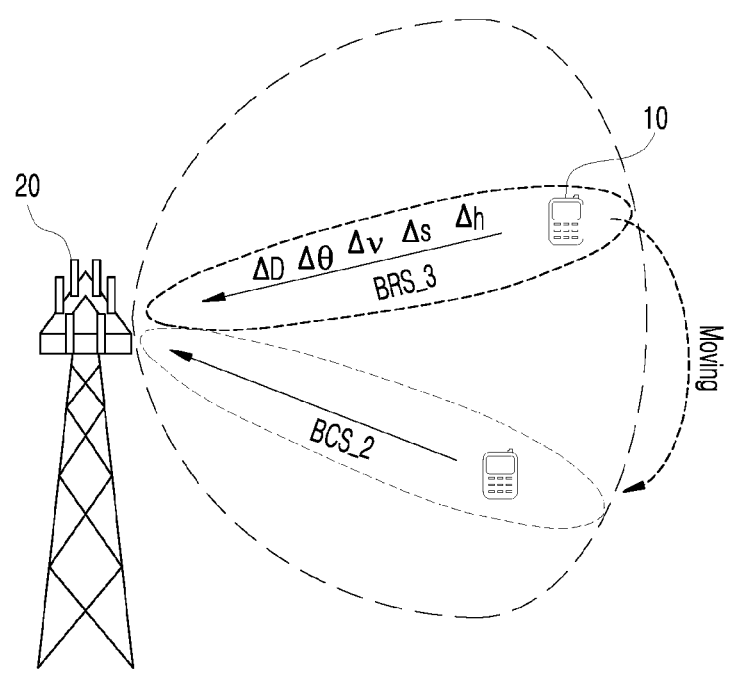
FIG. 8 is an exemplary view for describing a vertical tilt adjustment method according to an embodiment of the present disclosure.

In this case, when the beam control information is received from the terminal 10 through the beam pattern BRS_3 in which the communication link is established with the terminal 10, for example, as illustrated in FIG. 8, the controller 22 may reflect the movement displacement information ($\Delta D$, $\Delta \theta$, $\Delta v$, $\Delta s$, and $\Delta h$) in the beam control information as a vertical tilt variable value required for adjusting the directing direction of the beam, so it is possible to control the beam pattern BRS_2 to be tracked and formed to the change position predicted from the terminal 10.

Furthermore, when the signal equal to or greater than the predefined minimum signal strength transmitted from the terminal 10 is received at the change position through the beam pattern BRS_2 that is tracked and formed for the terminal 10, the controller 22 finely adjusts the directing direction of the beam to the terminal 10 by reflecting, as a horizontal tilt variable value, the movement displacement information ($\Delta D$, $\Delta \theta$, $\Delta v$, $\Delta s$, and $\Delta h$) in the beam control information identified from the corresponding signal as it is. For reference, FIG. 9 exemplarily illustrates a horizontal beamforming method according to an embodiment of the present disclosure.

Figure 9:
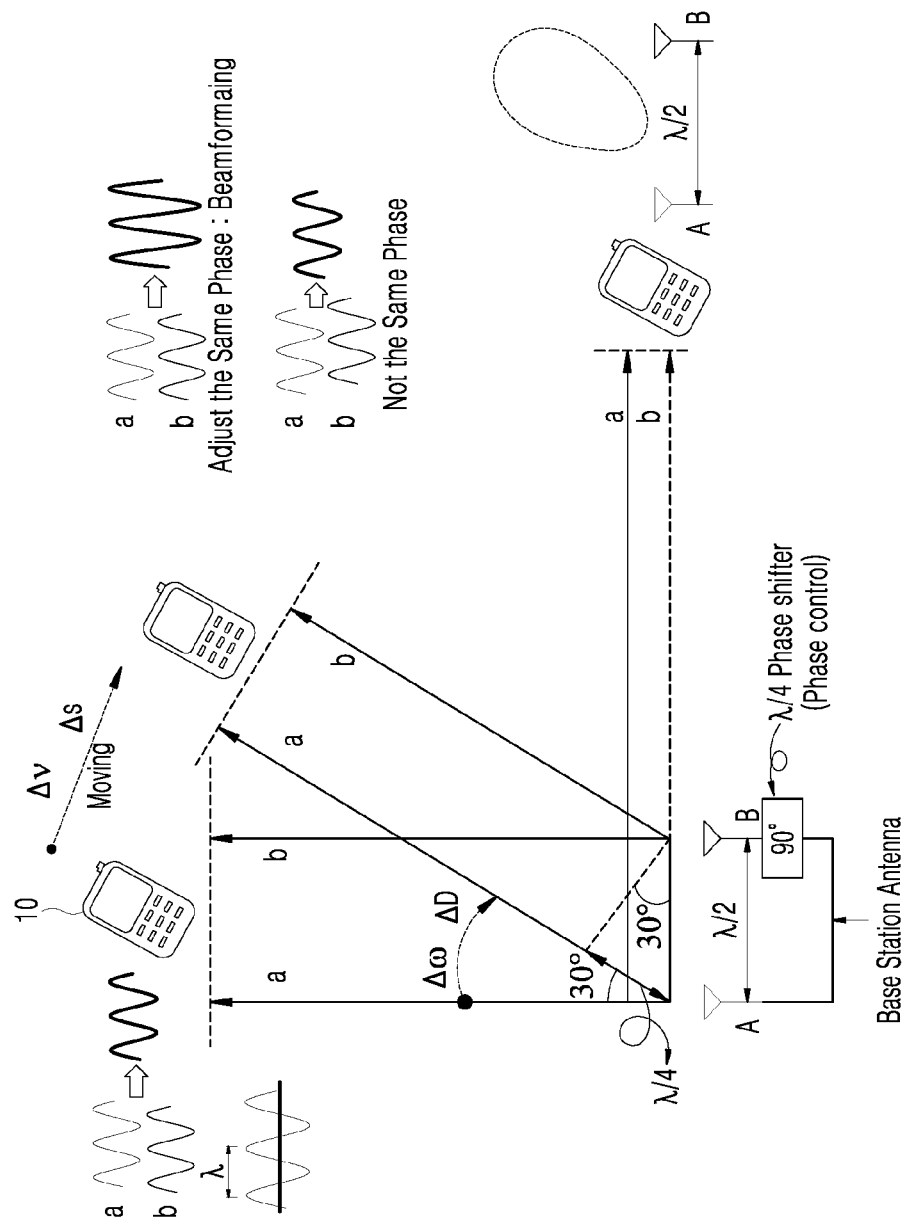
FIG. 9 is an exemplary view for describing a horizontal tilt adjustment method according to an embodiment of the present disclosure.

FIG. 9 assumes that the terminal 10 moves to the right 30° from the existing position. In this case, considering the right 30° direction, a received signal a that is transmitted from the antenna and received by the terminal 10 due to a distance difference arrives ¼ wavelength later than a received signal b.

That is, a arrives 90° later than b. However, a transmitted signal B starts 90° later from the antenna, so the received signals a and b arrive in the same phase, and the reception strength may be maximized by summing the signals.

That is, it may be understood that the beamforming is performed at the right 30°.

As a result, in the embodiment of the present disclosure, the beamforming may be performed in a free direction by controlling the phases of the transmitted signals A and B from the antenna, which may also be interpreted as being able to change the direction of the beam pattern in advance by accurately detecting the movement of the terminal 10 in real time. In addition, the controller 22 performs a function of controlling so that the beamforming codebook is generated.

More specifically, when the signal equal to or greater than the predefined minimum signal strength transmitted from the terminal 10 is not received at the change position through the beam pattern BRS_2 that is tracked and formed for the terminal 10, the controller 22 allows the generator 23 to generate the beamforming codebook for the terminal 10.

In this regard, the generator 23 generates the beamforming codebook, in which the tilt variable values for the formation of the beam pattern are matched, for each of at least one change prediction position that is the change position predicted for the terminal 10 based on the most recent movement displacement information received from the terminal 10.

In this case, the generator 23 may generate the beamforming codebook through an autocorrelation function-based linear prediction algorithm that linearly predicts the change in position according to the movement of the terminal in a time domain.

Figure 10:
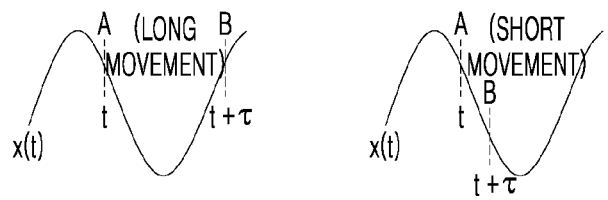
FIGS. 10 to 13 are exemplary views for describing a beamforming codebook generation method according to an embodiment of the present disclosure.

In this regard, when the terminal 10 moves from point A to point B as illustrated in FIG. 10, the correlation between two points in the time domain may be expressed by, for example, a correlation function as shown in [Equation 3] below.

$$R_{xx}(\tau) = \int_{-\infty}^{\infty} x(t)x(t+\tau)dt \qquad [\text{Equation 3}]$$

More specifically, this corresponds to a case where only the position of the same terminal 10 is changed in the time domain, and therefore, becomes an autocorrelation function, and the similarity between the two locations may be known, and therefore, the correlation for the next position may be estimated and predicted.

Here, the change position due to the movement may be assumed to be an average value for an arbitrary period for the change section.

In addition, the change in position of the beam pattern due to random movement due to the narrow beam width corresponds to a change for a very short time, and therefore, may be expressed by the autocorrelation function, and the correlation between the position of the previous beam pattern and the position of the next beam pattern at short time change may be predicted linearly.

Accordingly, in the embodiment of the present disclosure, the beamforming codebook may be generated through the autocorrelation function-based linear prediction algorithm that linearly predicts the position change according to the movement of the terminal 10.

However, in the embodiment of the present disclosure, when the movement distance of the terminal 10 is a non-linear movement that is greater than or equal to a threshold distance, the beamforming codebook may be generated through offset correction for setting an interval of the beam pattern to be narrow at a set interval for linearization of a change in position greater than or equal to a threshold speed based on a moving speed of the terminal 10 and the beamforming codebook may be generated through the offset correction for setting the interval of the beam pattern to be wide at a set interval for linearization of a change in position less than a threshold speed.

Figure 11:
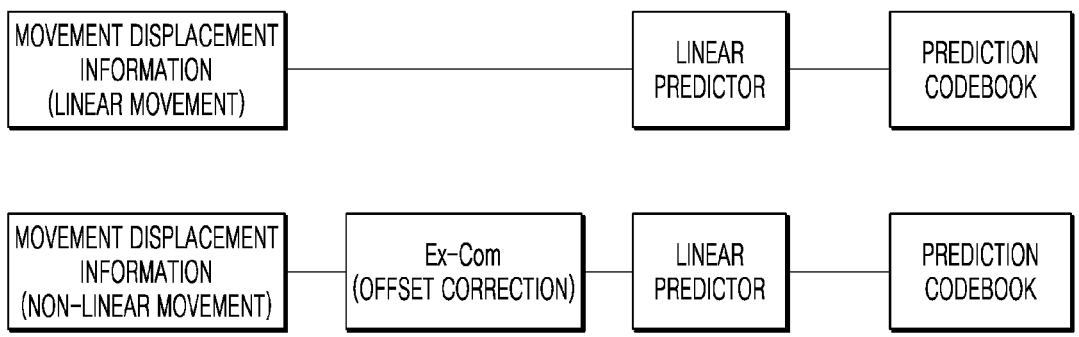
Figure 12:
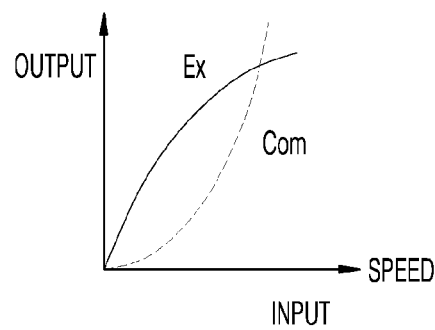
Figure 13:
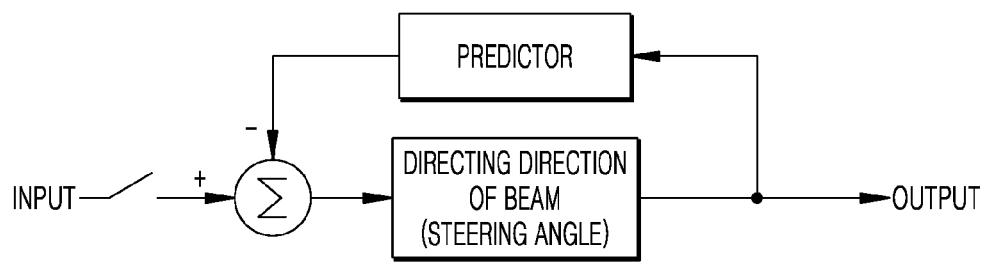

In this regard, FIG. 11 exemplarily illustrates an implementation method of a linear predictor that may reflect the above operation, FIG. 12 illustrates operating characteristics of Ex-com for offset correction, and FIG. 13 exemplarily illustrates a structure of a linear predictor.

In addition, the controller 22 performs the function of controlling the formation of the beam pattern based on the beamforming codebook.

More specifically, when the beamforming codebook in which the tilt variable values for the formation of the beam pattern are matched is generated for each of at least one change prediction position that is the change position predicted for the terminal 10, the controller 22 forms the beam patterns for each of at least one change prediction position predicted for the movement of the terminal 10 according to the matching value in the beamforming codebook.

Figure 14:
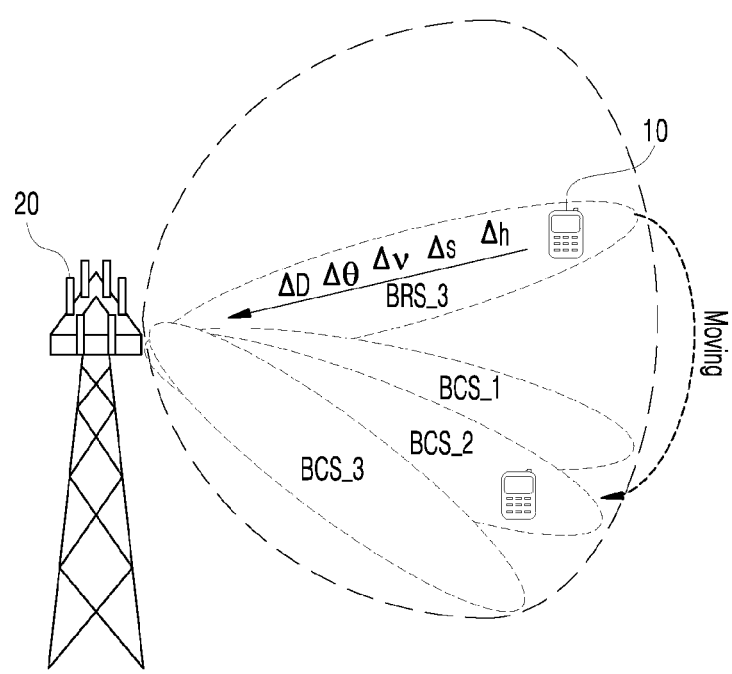
FIG. 14 is an exemplary diagram for describing a beam pattern forming method based on a beamforming codebook according to an embodiment of the present disclosure.

That is, the controller 22 does not form the beam pattern for finding the terminal 10 over the entire coverage according to the broadcast method as in the existing 5G environment, but for example, as illustrated in FIG. 14, minimizes the power consumption for the formation of the beam pattern by forming the beam patterns BCS_1, BCS_2, and BCS_3 through the unicast method for each of at least one change prediction position predicted for the movement of the terminal 10 according to the matching value of the beamforming codebook.

On the other hand, when the signal equal to or greater than the predefined minimum signal strength transmitted from the terminal 10 is received through the beam pattern BCS_2 of the specific change prediction position among the beam patterns BCS_1, BCS_2, and BCS_3 formed with reference to the beamforming codebook, the controller 22 may re-establish the communication link with the terminal 10 through the beam pattern BCS_2 of the specific change prediction position.

In addition, the controller 22 performs a function of processing a handoff situation.

More specifically, when a handoff situation occurs in which the signal equal to or greater than the predefined minimum signal strength transmitted from the terminal 10 is not received through all of the beam patterns BCS_1, BCS_2, and BCS_3 formed with reference to the beamforming codebook, the controller 22 transmits the movement displacement information of the terminal 10 to the neighboring base station apparatus (not illustrated) attempting the handoff of the terminal 10.

In this regard, the neighboring base station apparatus (not illustrated) that has received the movement displacement information of the terminal 10 may generate the beamforming codebook using the movement displacement information of the terminal 10 as in the base station apparatus 20, and form the beam pattern for the terminal 10 in the unicast method based on the generated beamforming codebook to establish the communication link with the terminal 10.

As described above, according to the configuration of the base station apparatus 20 according to the embodiment of the present disclosure, it becomes possible to find a terminal 10 that newly enters coverage or to track the terminal 10 that is moving within the coverage by the unicast method that is a method of directly inputting, as a tilt variable value required for adjusting a directing direction of a beam, beam control information (movement displacement information) generated (calculated) by allowing the terminal 10 to directly detect the movement, thereby improving accuracy of beam steering (steerability) and minimizing power consumption compared to the existing 5G environment in which the beam pattern is formed through the broadcast method.

Figure 15:
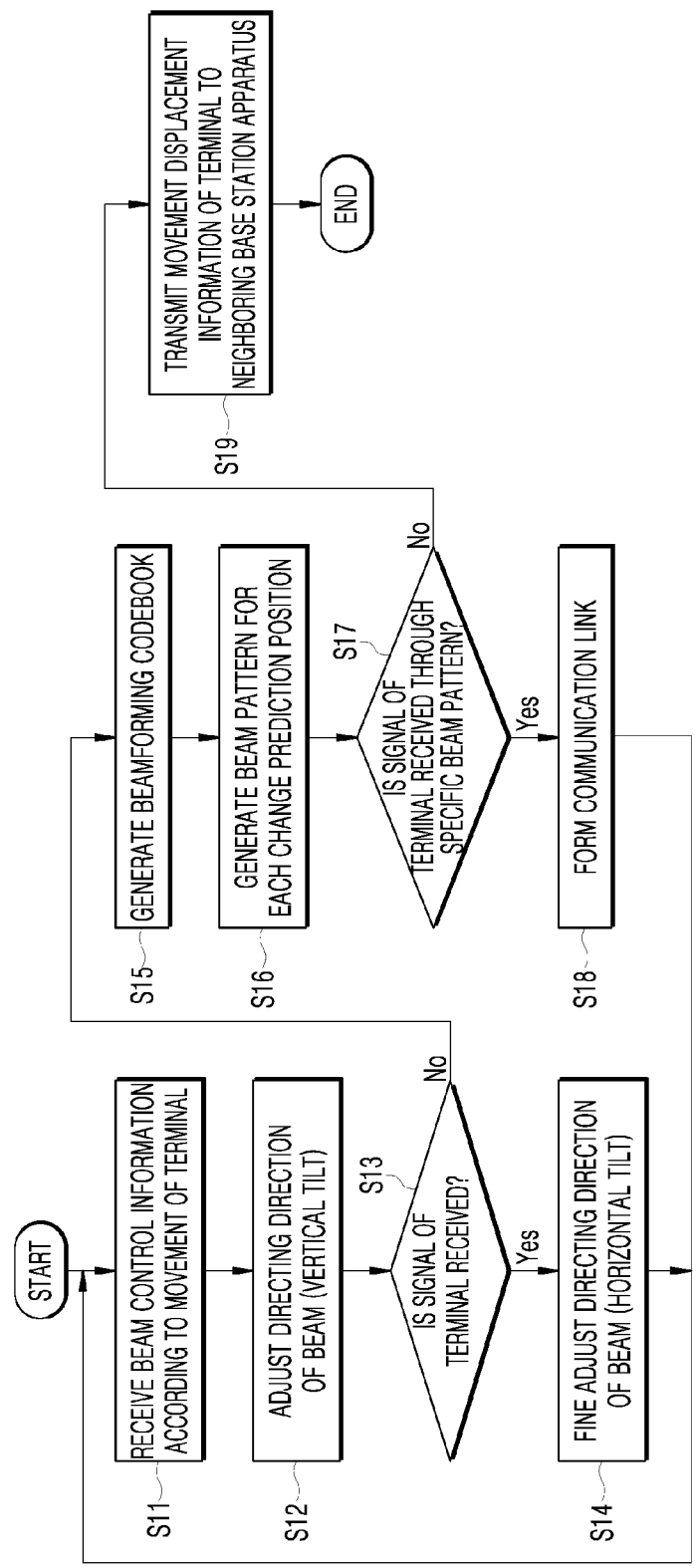
FIG. 15 is a flowchart for describing a method of operating a base station apparatus according to an embodiment of the present disclosure.

Hereinafter, a method of operating a base station apparatus 20 according to an embodiment of the present disclosure will be described with reference to FIG. 15.

Meanwhile, the following description will be based on the embodiment in which the communication link is already established through a specific beam pattern with respect to the terminal 10 located in the coverage of the base station apparatus 20, and the beamforming codebook is directly generated in the base station apparatus 20.

First, the receiver 21 receives the beam control information generated based on the movement detection result from the terminal 10 according to movement detection in the terminal 10 in which the communication link is formed through the beam pattern (S11).

Here, the beam control information received from the terminal 10 includes the movement displacement information of the terminal 10 that is the tilt variable value required for adjusting the directing direction of the beam radiated to the terminal 10.

In addition, the movement displacement information may include at least one of a speed ($\Delta v$) obtained by integrating acceleration with respect to time, displacement information ($\Delta s$) obtained by integrating the speed ($\Delta v$) with respect to time, a displacement angle ($\Delta \theta$) obtained by integrating angular velocity ($\omega$) with respect to time, a movement direction ($\Delta D$) identified by an accumulation of the displacement angle ($\Delta \theta$), and an altitude ($\Delta h$).

Meanwhile, it goes without saying that the movement displacement information according to the embodiment of the present disclosure may further include position information (latitude and longitude) measured through a GPS function supported by the terminal 10 as well as the above-described movement displacement information.

Thereafter, when the beam control information is received from the terminal 10 through the beam pattern BRS_3 in which the communication link is established with the terminal 10, for example, as illustrated in FIG. 8 described above, the controller 22 may reflect the movement displacement information ($\Delta D$, $\Delta \theta$, $\Delta v$, $\Delta s$, and $\Delta h$) in the beam control information as a vertical tilt variable value required for adjusting the directing direction of the beam, so it is possible to control the beam pattern BRS_2 to be tracked and formed to the change position predicted from the terminal 10 (S12).

Furthermore, when the signal equal to or greater than the predefined minimum signal strength transmitted from the terminal 10 is received at the change position through the beam pattern BRS_2 that is tracked and formed for the terminal 10, the controller 22 finely adjusts the directing direction of the beam to the terminal 10 by reflecting, as a horizontal tilt variable value, the movement displacement information ($\Delta D$, $\Delta \theta$, $\Delta v$, $\Delta s$, and $\Delta h$) in the beam control information identified from the corresponding signal as it is (S13 and S14).

Meanwhile, when the signal equal to or greater than the predefined minimum signal strength transmitted from the terminal 10 is not received at the change position through the beam pattern BRS_2 that is tracked and formed for the terminal 10 in step S13 described above, the controller 22 allows the generator 23 to generate the beamforming codebook for the terminal 10 (S15).

In this regard, the generator 23 generates the beamforming codebook, in which the tilt variable values for the formation of the beam pattern are matched, for each of at least one change prediction position that is the change position predicted for the terminal 10 based on the most recent movement displacement information received from the terminal 10.

In this case, the generator 23 may generate the beamforming codebook through an autocorrelation function-based linear prediction algorithm that linearly predicts the change in position according to the movement of the terminal in a time domain.

Here, when the movement distance of the terminal 10 is a non-linear movement that is greater than or equal to a threshold distance, the generator 23 may generate the beamforming codebook through offset correction for setting an interval of the beam pattern to be narrow at a set interval for linearization of a change in position greater than or equal to a threshold speed based on a moving speed of the terminal 10 and generate the beamforming codebook through the offset correction for setting the interval of the beam pattern to be wide at a set interval for linearization of a change in position less than a threshold speed.

Thereafter, when the beamforming codebook in which the tilt variable values for the formation of the beam pattern are matched is generated for each of at least one change prediction position that is the change position predicted for the terminal 10, the controller 22 forms the beam patterns for each of at least one change prediction position predicted for the movement of the terminal 10 according to the matching value in the beamforming codebook (S16).

That is, the controller 22 does not form the beam pattern for finding the terminal 10 over the entire coverage according to the broadcast method as in the existing 5G environment, but for example, as illustrated in FIG. 13, minimizes the power consumption for the formation of the beam pattern by forming the beam patterns BCS_1, BCS_2, and BCS_3 through the unicast method for each of at least one change prediction position predicted for the movement of the terminal 10 according to the matching value of the beamforming codebook.

Furthermore, when the signal equal to or greater than the predefined minimum signal strength transmitted from the terminal 10 is received through the beam pattern BCS_2 of the specific change prediction position among the beam patterns BCS_1, BCS_2, and BCS_3 formed with reference to the beamforming codebook, the controller 22 may re-establish the communication link with the terminal 10 through the beam pattern BCS_2 of the specific change prediction position (S17 and S18).

However, when a handoff situation occurs in which the signal equal to or greater than the predefined minimum signal strength transmitted from the terminal 10 is not received through all of the beam patterns BCS_1, BCS_2, and BCS_3 formed with reference to the beamforming codebook in step S17 described above, the controller 22 transmits the movement displacement information of the terminal 10 to the neighboring base station apparatus (not illustrated) attempting the handoff of the terminal 10 (S19).

In this regard, the neighboring base station apparatus (not illustrated) that has received the movement displacement information of the terminal 10 may generate the beamforming codebook using the movement displacement information of the terminal 10 as in the base station apparatus 20, and form the beam pattern for the terminal 10 in the unicast method based on the generated beamforming codebook to establish the communication link with the terminal 10.

Figure 16:
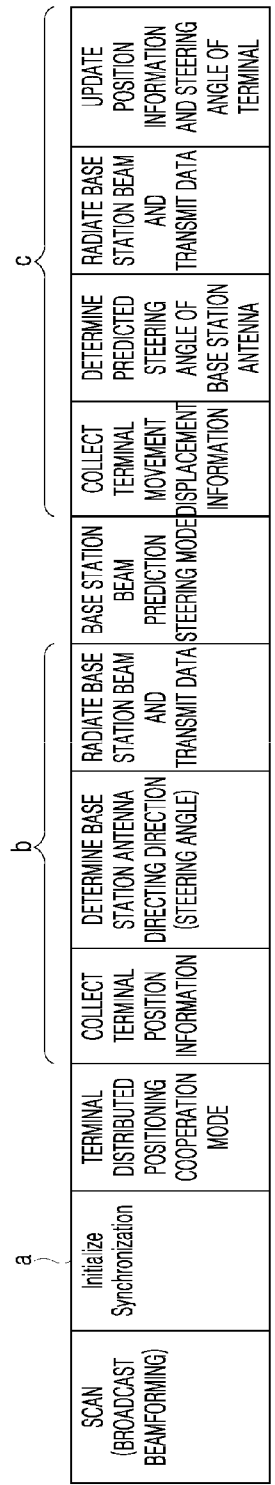
FIG. 16 is an exemplary diagram of a MAC protocol according to an embodiment of the present disclosure.

Meanwhile, the method of operating a base station apparatus 20 described above may be defined in the form of, for example, a MAC protocol as illustrated in FIG. 16.

That is, as illustrated in FIG. 16, the MAC protocol according to the embodiment of the present disclosure may largely divide the method of operating a base station apparatus 20 into a base station beam scan synchronization mode (a), a terminal distributed positioning mode (b), and a base station beam prediction steering mode (c).

Here, the base station beam scan synchronization mode (a) is understood as a procedure of processing synchronization with the terminal 10 by scanning a beam in a broadcasting method in order to establish the communication link with the terminal 10 that initially enters coverage.

In addition, the terminal distributed positioning mode (b) is a mode following the base station beam scan synchronization mode (a), and may be understood as the process of steps S11 to S14 described above which are a procedure of receiving the beam control information generated based on the movement detection result from the terminal 10 to input the movement displacement information in the beam control information as the tilt variable value required for adjusting the directing direction of the beam radiated to the terminal 10.

The base station beam prediction steering mode (c) is a mode considering the beam tracking situation according to the movement within the coverage of the terminal (a) and the handoff situation of the terminal 10, and may be understood as the process of steps S15 to S19 described above which is a procedure of forming a beam pattern according to a unicast method to a moving position predicted for the terminal 10 with reference to the beamforming codebook or transmitting movement displacement information for beamforming codebook generation to a neighboring base station apparatus.

As described above, according to the method of operating a base station apparatus 20 according to the embodiment of the present disclosure, it becomes possible to find a terminal 10 that newly enters coverage or to track the terminal 10 that is moving within the coverage by the unicast method that is a method of directly inputting, as a tilt variable value required for adjusting a directing direction of a beam, beam control information (movement displacement information) generated (calculated) by allowing the terminal 10 to directly detect the movement, thereby improving accuracy of beam steering (steerability) and minimizing power consumption compared to the existing 5G environment in which the beam pattern is formed through the broadcast method.

Meanwhile, the functional operations and implementations of the subject matter described in this specification may be implemented as digital electronic circuits, may be implemented as computer software, firmware, or hardware including the structures disclosed in this specification and structural equivalents thereof, or may be implemented as at least one combination of these. Implementations of the subject matter described herein may be implemented as one or more computer program products, that is, one or more modules of computer program instructions encoded on a tangible program storage medium for controlling an operation of a processing system or execution by the processing system.

A computer-readable medium may be a machine-readable storage device, a machine-readable storage substrate, a memory device, a composition of matters that affect a machine-readable radio wave signal, or a combination of one or more thereof.

In the present specification, the term "system" or "device" encompasses all mechanisms, devices, and machines for processing data, including, for example, programmable processors, computers, multiple processors, or computers. The processing system may include, in addition to hardware, a code forming an execution environment for a computer program upon request, such as a code constituting processor firmware, a protocol stack, a database management system, an operating system, or a combination of one or more thereof.

A computer program (also known as a program, software, software application, script, or code) may be written in any form of programming languages, including compiled or interpreted language or a priori or procedural language, and may be deployed in any form, including standalone programs or modules, components, subroutines, or other units suitable for use in a computer environment. A computer program does not necessarily correspond to a file in a file system. A program may be stored in a single file provided to the requested program, or in multiple interacting files (e.g., files storing one or more modules, subprograms, or portions of code), or portions (e.g., one or more scripts stored within a markup language document) of files that hold other programs or data. The computer program may be deployed to be executed on a single computer or multiple computers that are located at one site or distributed over a plurality of sites and interconnected by a communication network.

Meanwhile, the computer-readable medium suitable for storing computer program instructions and data may include, for example semiconductor memory devices such as EPROM, EEPROM, and a flash memory device, for example magnetic disks such as internal hard disks or external disks, magneto-optical disks, all types of nonvolatile memories including CD-ROM and DVD-ROM disks, media, and memory devices. The processor and memory may be supplemented by, or integrated into, special purpose logic circuitry.

The implementations of the subject matter described herein may include, for example, backend components such as a data server, may include, for example, middleware components such as an application server, or may be implemented in a front-end component like a client computer having a web browser or graphical user interface through which a user may interact with the implementation of the subject matter described herein, or an operation system including all combinations of one or more of such back-end, middleware or front-end components. The components of the system may be interconnected by any form or medium of digital data communication, such as, for example, a communication network.

While the present specification includes a plurality of specific implementations, these are not to be construed as limitations on the scope of any invention or claim, but should rather be understood as a description of features that may be specific to particular embodiments of particular inventions. Likewise, certain features that are described herein in the context of separate embodiments may be implemented in combination in a single embodiment. Conversely, various features that are described in the context of a single embodiment may also be implemented in multiple embodiments, either individually or in any suitable sub-combination. Furthermore, although features operate in a particular combination and may be initially depicted as claimed as such, one or more features from a claimed combination may be excluded from the combination in some cases, and the claimed combination may be changed to a sub-combination or a variant of the sub-combination.

Also, while the drawings depict operations in a specific order, it is not to be understood that such operations should be performed in the specific order or sequential order shown or that all illustrated operations should be performed in order to obtain a desirable result. In certain cases, multitasking and parallel processing may be advantageous. Further, the separation of various system components of the above-described embodiments should not be construed as requiring such separation in all embodiments, and it should be understood that the program components and systems described may generally be integrated together into a single software product or packaged into multiple software products.

As such, the present specification is not intended to limit the invention to the specific terms presented. Accordingly, although the present disclosure has been described in detail with reference to the above-described examples, those skilled in the art can make modifications, changes, and modifications to the examples without departing from the scope of the present disclosure. It is to be understood that the scope of the present disclosure will be defined by the claims rather than the above-mentioned description and all modifications and alternations derived from the claims and their equivalents are included in the scope of the present disclosure.

What is claimed is:

1. A base station apparatus, comprising:
    a receiver configured to receive beam control information generated based on a result of movement detection from a terminal according to movement detection in the terminal in which a communication link is established with a base station apparatus through a beam pattern;
    a controller configured to control a beam pattern to be tracked and formed at a change position predicted from the terminal by adjusting a directing direction of the beam radiated to the terminal based on the beam control information; and
    a generator configured to generate a beamforming codebook in which a tilt variable value for forming a beam pattern is matched for each of at least one change prediction position that is a change position predicted for the terminal based on movement displacement information of the terminal which is a tilt variable value required for adjusting the directing direction of the beam radiated to the terminal,
    wherein the beam control information includes the movement displacement information, and
    wherein, when a signal having equal to or greater than predefined minimum signal strength transmitted from the terminal is not received through a beam pattern tracked and formed by the change position of the terminal, the controller forms a unicast beam pattern for each of the at least one change prediction positions based on the beamforming codebook.

2. The base station apparatus of claim 1, wherein, when the signal equal to or greater than the predefined minimum signal strength transmitted from the terminal is received through a beam pattern of a specific change prediction position among the at least one change prediction position, the controller re-establishes the communication link with the terminal through the beam pattern of the specific change prediction position.

3. The base station apparatus of claim 1, wherein, when a handoff situation occurs in which the signal of the predefined minimum signal strength or higher transmitted from the terminal is not received through all of the beam patterns of each of the at least one change prediction positions,
    the controller establishes the communication link with the terminal according to the beamforming codebook generated based on the movement displacement information of the terminal in a neighboring base station apparatus by transmitting the movement displacement information of the terminal to the neighboring base station apparatus attempting handoff of the terminal.

4. The base station apparatus of claim 1, wherein the generator generates the beamforming codebook through an autocorrelation function-based linear prediction algorithm that linearly predicts a change in position according to the movement of the terminal in a time domain.

5. The base station apparatus of claim 4, wherein, when a movement distance of the terminal is a non-linear movement that is greater than or equal to a threshold distance, the generator generates the beamforming codebook through offset correction for setting an interval of the beam pattern to be narrow at a set interval for linearization of a change in position greater than or equal to a threshold speed based on a moving speed of the terminal and generates the beamforming codebook through the offset correction for setting the interval of the beam pattern to be wide at a set interval for linearization of a change in position less than a threshold speed.

6. The base station apparatus of claim 1, wherein the beamforming codebook is generated every time the movement displacement information of the terminal is updated with respect to the base station apparatus in a core network that receives and updates the movement displacement information of the terminal from the base station apparatus, and is transmitted to the base station apparatus.

7. The base station apparatus of claim 1, wherein the movement displacement information includes at least one of a speed obtained by integrating acceleration with respect to time, displacement information obtained by integrating the speed with respect to time, a displacement angle obtained by integrating angular velocity with respect to time, a movement direction identified by an accumulation of the displacement angle, and an altitude.

8. A method of operating a base station apparatus, comprising:
receiving beam control information generated based on a result of movement detection from a terminal according to movement detection in the terminal in which a communication link is established with the base station apparatus through a beam pattern;
controlling a beam pattern to be tracked and formed at a change position predicted from the terminal by adjusting a directing direction of the beam radiated to the terminal based on the beam control information; and
generating a beamforming codebook in which a tilt variable value for forming a beam pattern is matched for each of at least one change prediction position that is a change position predicted for the terminal based on movement displacement information of the terminal which is a tilt variable value required for adjusting the directing direction of the beam radiated to the terminal,
wherein the beam control information includes the movement displacement information, and
wherein in the controlling, when a signal having equal to or greater than a predefined minimum signal strength transmitted from the terminal is not received through a beam pattern tracked and formed by the change position of the terminal, a unicast beam pattern for each of the at least one change prediction positions is formed based on the beamforming codebook.

9. The method of claim 8, wherein in the generating, the beamforming codebook is generated through an autocorrelation function-based linear prediction algorithm that linearly predicts a change in the position according to the movement of the terminal in a time domain.

10. The method of claim 8, wherein the beamforming codebook is generated every time the movement displacement information of the terminal is updated with respect to the base station apparatus in a core network that receives and updates the movement displacement information of the terminal from the base station apparatus, and is transmitted to the base station apparatus.

11. The method of claim 8, wherein the movement displacement information includes at least one of a speed obtained by integrating acceleration with respect to time, displacement information obtained by integrating the speed with respect to time, a displacement angle obtained by integrating angular velocity with respect to time, a movement direction identified by an accumulation of the displacement angle, and an altitude.

* * * * *